US006757836B1

(12) United States Patent
Kumar et al.

(10) Patent No.: US 6,757,836 B1
(45) Date of Patent: Jun. 29, 2004

(54) METHOD AND APPARATUS FOR RESOLVING PARTIAL CONNECTIVITY IN A CLUSTERED COMPUTING SYSTEM

(75) Inventors: Krishna Kumar, Cupertino, CA (US); Declan J. Murphy, San Francisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/479,468

(22) Filed: Jan. 10, 2000

(51) Int. Cl.[7] .............................................. G06F 11/00

(52) U.S. Cl. .............................. 714/4; 714/11; 714/12; 714/13

(58) Field of Search ............................ 714/4, 11–13; 709/102–105

(56) References Cited

U.S. PATENT DOCUMENTS

| | | | |
|---|---|---|---|
| 5,283,783 A | * | 2/1994 | Nguyen et al. ............... 714/4 |
| 5,459,857 A | | 10/1995 | Ludlam et al. |
| 5,687,308 A | | 11/1997 | Jardine et al. |
| 5,774,660 A | | 6/1998 | Brendel et al. |
| 5,790,772 A | | 8/1998 | Badovinatz et al. |
| 5,822,531 A | | 10/1998 | Gorczyca et al. |
| 5,890,014 A | | 3/1999 | Long |
| 5,909,540 A | | 6/1999 | Carter et al. |
| 5,918,017 A | | 6/1999 | Attanasio et al. |
| 5,964,838 A | | 10/1999 | Cheung et al. |
| 5,964,886 A | | 10/1999 | Slaughter et al. |
| 5,991,518 A | * | 11/1999 | Jardine et al. ............... 714/4 |
| 5,996,001 A | | 11/1999 | Quarles et al. |
| 6,002,851 A | | 12/1999 | Basavaiah et al. |
| 6,003,075 A | | 12/1999 | Arendt et al. |
| 6,097,882 A | | 8/2000 | Mogul |
| 6,108,699 A | * | 8/2000 | Moiin ........................ 709/226 |
| 6,185,619 B1 | | 2/2001 | Joffe et al. |
| 6,192,483 B1 | | 2/2001 | Moiin et al. |
| 6,195,680 B1 | | 2/2001 | Goldszmidt et al. |
| 6,219,786 B1 | | 4/2001 | Cunningham et al. |
| 6,226,684 B1 | | 5/2001 | Sung et al. |
| 6,243,744 B1 | | 6/2001 | Snaman, Jr. et al. |
| 6,247,141 B1 | | 6/2001 | Holmberg |
| 6,256,675 B1 | | 7/2001 | Rabinovich |
| 6,304,980 B1 | | 10/2001 | Beardsley et al. |
| 6,363,077 B1 | | 3/2002 | Wong et al. |
| 6,363,495 B1 | * | 3/2002 | MacKenzie et al. ........... 714/4 |
| 6,424,992 B2 | | 7/2002 | Devarakonda et al. |
| 6,427,163 B1 | | 7/2002 | Arendt et al. |

(List continued on next page.)

FOREIGN PATENT DOCUMENTS

| | | |
|---|---|---|
| EP | 0817444 A2 | 1/1998 |
| EP | 0865180 A2 | 9/1998 |
| WO | 98/26559 | 6/1998 |
| WO | 98/33227 | 7/1999 |

OTHER PUBLICATIONS

Scheible, "Information Technology, Serial Storage Architecture–SCSI–3 Protocol (SSA–S3P)," Rev. 5b, Apr. 1997.

(List continued on next page.)

Primary Examiner—Robert Beausoliel
Assistant Examiner—Michael Maskulinski
(74) Attorney, Agent, or Firm—Beyer, Weaver & Thomas, LLP.

(57) ABSTRACT

Improved techniques for resolving partial connectivity in clustered computing systems are disclosed. The improved techniques allow for detection of one or more disconnections that cause a loss of full connectivity and then resolution of the disconnections by shutting down one or more appropriate nodes of the clustered computing system to regain full connectivity. As a result, the clustered computing system can effectively maintain a full connectivity condition that is often needed by software running on the nodes of the clustered computing system.

3 Claims, 9 Drawing Sheets

U.S. PATENT DOCUMENTS

| | | |
|---|---|---|
| 6,438,652 B1 | 8/2002 | Jordan et al. |
| 6,438,705 B1 * | 8/2002 | Chao et al. ................. 709/226 |
| 6,445,709 B1 | 9/2002 | Chiang |
| 6,453,426 B1 | 9/2002 | Gamache et al. |
| 6,470,389 B1 | 10/2002 | Chung et al. |
| 6,532,494 B1 | 3/2003 | Frank et al. |

OTHER PUBLICATIONS

Lamport, "A New Solution of Dijkstra's Concurrent Programming Problem," Aug. 1974, Communications of the ACM, vol. 17, No. 8, pp 453–455.

Preslan et al., "Device Locks: Mutual Exclusion for Storage Area Networks," Mar. 15, 1999, IEEE.

Soltis et al., "The Design and Performance of a Shared Disk File System for IRIX," Mar. 23, 1998, Sixth NASA Goddard Space Center Conference on Mass Storage and Technologies.

VanHalderen et al., "Hierarchical resource management in the Polder metacomputing Initiative", (11/98) Parallel Computing, NL/Elsevier Science Publ., Amsterdam. vol. 24, No. 12–13, pp. 1807–1825.

Chang et al., "An ordered and reliable broadcast protocol for distributed systems", (7/97) Computer Comm., NL/Elsevier Science Publ., Amsterdam, vol. 20, No. 6, pp. 487–499.

Hunt et al., "Network Dispatcher: a connection router for scalable Internet services", Computer Networks and ISDN Systems 30(1998) 347–357.

Goldszmidt, "Load Management for Scaling up Internet Services", IEEE, 1998 pp. 828–835.

* cited by examiner

METHOD AND APPARATUS FOR RESOLVING PARTIAL CONNECTIVITY IN A CLUSTERED COMPUTING SYSTEM

CROSS-REFERENCE TO RELATED APPLICATIONS

This application is related to the following applications, filed concurrently herewith and incorporated herein by reference: (1) U.S. patent application Ser. No. 09/480,785, entitled "METHOD AND APPARATUS FOR MANAGING OPERATIONS OF CLUSTERED COMPUTER SYSTEMS"; (2) U.S. patent application Ser. No. 09/480,466, entitled "METHOD AND APPARATUS FOR DYNAMICALLY ALTERING CONFIGURATIONS OF CLUSTERED COMPUTER SYSTEMS"; (3) U.S. patent application Ser. No. 09/479,485, entitled "CONTROLLED TAKE OVER OF SERVICES BY REMAINING NODES OF CLUSTERED COMPUTING SYSTEM"; (4) U.S. patent application Ser. No. 09/480,330, entitled "METHOD TO DYNAMICALLY CHANGE CLUSTER OR DISTRIBUTED SYSTEM CONFIGURATION"; and (5) U.S. patent application Ser. No. 09/480,329, entitled "EMULATION OF PERSISTANT GROUP RESERVATIONS".

BACKGROUND OF THE INVENTION

1. Field of the Invention

The present invention relates to computer systems and, more particularly, to improved methods and apparatus for maintaining full connectivity in clustered computer systems.

2. Description of the Related Art

Figure 1:
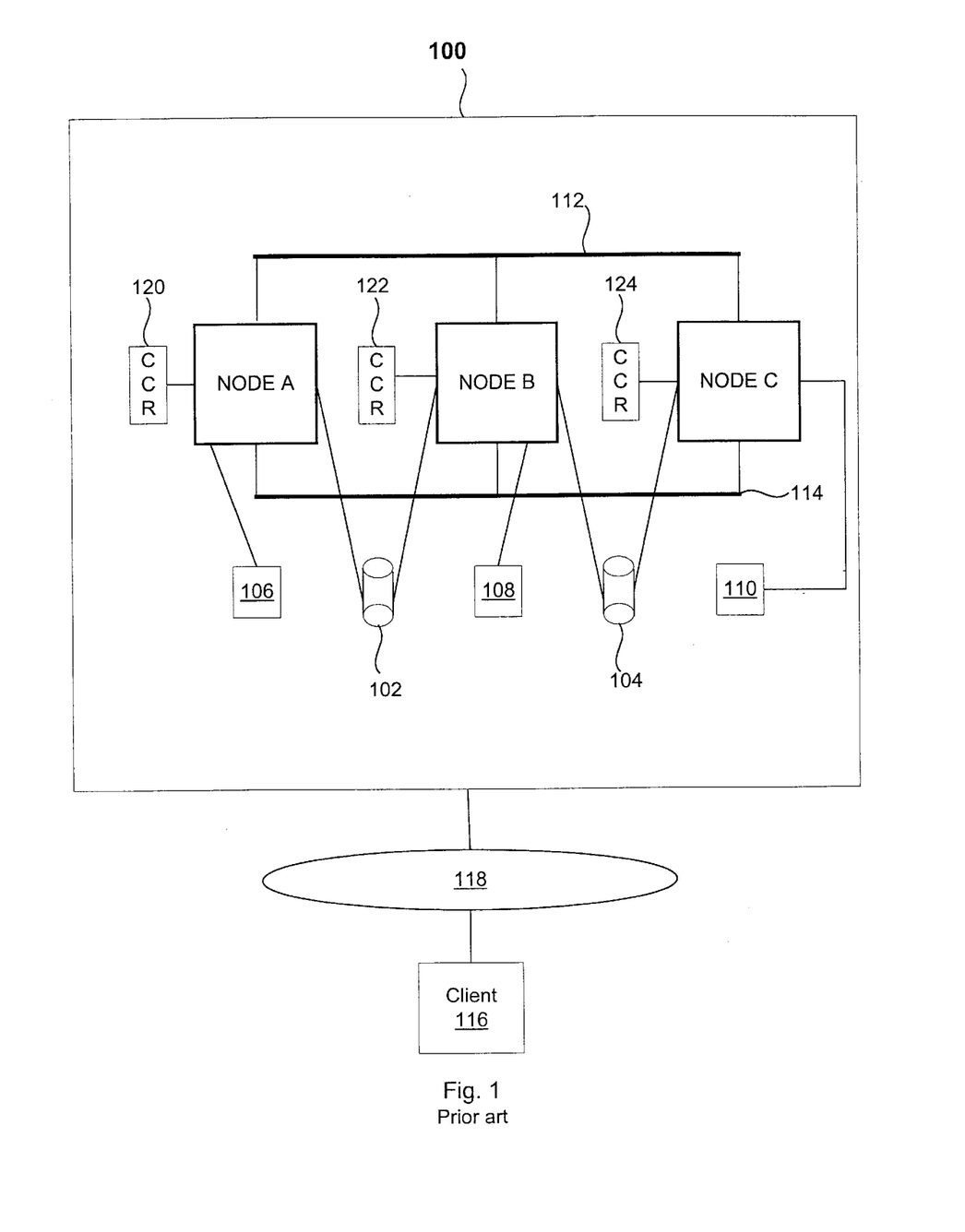
FIG. 1 illustrates an exemplary clustered computing system.

In contrast to single mainframe computing models of the past, more distributed computing models have recently evolved. One such distributed computing model is known as a clustered computing system. FIG. 1 illustrates an exemplary clustered computing system 100 including computing nodes (nodes) A, B and C, storage devices (e.g., storage disks 102–104), and other devices 106–110 representing other devices such as scanners, printers, digital cameras, etc. For example, each of the nodes A, B and C can be a computer with its own processor and memory. The collection of nodes A, B and C, storage disks 102–104, and other devices 106–110 make up the clustered computing system 100.

Typically, the nodes in a cluster are coupled together through a "private" interconnect with redundant pathways. As shown in FIG. 1, nodes A, B and C are coupled together through private communication channels 112 and 114. For example, the private communication channels 112 and 114 can adhere to Ethernet, ATM, or Scalable Coherent Interface (SCI) standards. A client 116 can communicate with the clustered computing system 100 via a network 118 (e.g., public network) using a variety of protocols such as Transmission Control Protocol (TCP), User Datagram Protocol (UDP), etc. From the point of view of the client 116, the clustered computing system 100 is a single entity that can provide the client 116 with a variety of computer-implemented services, e.g., web-hosting, transaction processing, etc. In other words, the client 116 is not aware of which particular node(s) of the clustered computing system 100 is (are) providing it services.

The clustered computing system 100 provides a scalable and cost-efficient model where off-the-shelf computers can be used as nodes. The nodes in the clustered computing system 100 cooperate with each other to provide a distributed computing model that is transparent to users, e.g., the client 116. In addition, in comparison with single mainframe computing models, the clustered computing system 100 provides improved fault tolerance. For example, in case of a node failure within the clustered computing system 100, other nodes can take over to perform the services normally performed by the node that has failed.

Typically, nodes in the clustered computing system 100 send each other "responsive" (often referred to as "heart beat" or activation) signals over the private communication channels 112 and 114. The responsive signals indicate whether nodes are active and responsive to other nodes in the clustered computing system 100. Accordingly, these responsive signals are periodically sent by each of the nodes so that if a node does not receive the responsive signal from another node within a certain amount a time, a node failure can be suspected. For example, in the clustered computing system 100, if nodes A and B do not receive a signal from node C within an allotted amount of time, nodes A and B can suspect that node C has failed. In this case, if nodes A and B are still responsive to each other, a two-node sub-cluster (AB) results. From the perspective of the sub-cluster (AB), node C can be referred to as a "non-responsive" node. If node C has really failed then it would be desirable for the two-node sub-cluster (AB) to take over services from node C. However, if node C has not really failed, taking over the services performed by node C could have dire consequences. For example, if node C is performing write operations to the disk 104 and node B takes over is the same write operations while node C is still operational, data corruption can result.

It should be noted that the fact that nodes A and B have not received responsive signals from node C does not necessarily mean that node C is not operational with respect to the services that are provided by node C. Other events can account for why responsive signals for node C have not been received by nodes A and B. For example, the private communication channels 112 and 114 may have failed. It is also possible that node C's program for sending responsive signals may have failed but node C is fully operational with respect to the services that it provides. Thus, it is possible for the clustered computing system 100 to get divided into two or more functional sub-clusters wherein the sub-clusters are not responsive to each other. This situation can be referred to as a "partition in space" or "split brain" where the cluster no longer behaves as a single cohesive entity. In this and other situations, when the clustered computing system no longer behaves as a single cohesive entity, it can be said that the "integrity" of the system has been compromised.

In addition to partitions in space, there are other potential problems that need to be addressed in managing the operation of clustered computing systems. For example, another potential problem associated with operating clustered computing systems is referred to as a "partition in time" or "amnesia." As is known to those skilled in the art, partitions in time can occur when a clustered computing system is operated with cluster configurations that vary over time.

Another problem that can affect clustered computing systems is loss of full connectivity. It is common that nodes of a clustered computing system be connected to every other node in the clustered computing system. Some software that is run on clustered computing systems even assumes, and thus requires, that the clustered computing systems have full connectivity. Hence, problems result when such clustered computing systems lose full connectivity. The loss of full connectivity means that the clustered computing system has incomplete (or partial) connectivity. Normally, the incomplete connectivity is caused by failure of an interconnect that couples nodes together. The loss of full connectivity can cause software to crash or "hang". Accordingly, conventional approaches, such as described in U.S. Pat. No. 6,002, 851, maintain full connectivity through use of sophisticated, centralized approaches that attempt to determine which nodes to shut down so that the remaining active nodes of the clustered computing system are fully connected. The disadvantage of this conventional approach is that in order to obtain an optimal solution it is overly complex. As a result of the complexity, the software implementing the optimal solution is complex and lengthy and thus prone to "bugs" (i.e., defects).

In view of the foregoing, there is a need for improved techniques to maintain full connectivity in clustered computer systems.

SUMMARY OF THE INVENTION

Broadly speaking, the invention pertains to techniques for maintaining full connectivity in a clustered computing system. The improved techniques allow for detection of one or more disconnections that cause a loss of full connectivity and then resolution of the disconnections by shutting down one or more appropriate nodes of the clustered computing system to regain full connectivity. As a result, the clustered computing system can effectively maintain full connectivity as is often required by software running on the nodes of the clustered computing system.

The invention can be implemented in numerous ways, including a method, a system, an apparatus, or a computer readable medium. Several embodiments of the invention are discussed below.

As a method for monitoring full connectivity in a clustered computing system having more than two nodes, one embodiment of the invention includes the acts of: detecting loss of full connectivity in the clustered computing system; determining, at each of the nodes, which one or more of the nodes of the clustered computing system should be shut down to regain full connectivity in the clustered computing system; and shutting down the one or more nodes of the clustered computing system that the determining has determined should be shut down to regain full connectivity in the clustered computing system.

As a method for maintaining full connectivity in a clustered computing system having more than two nodes, one embodiment of the invention includes the acts of: detecting loss of full connectivity in the clustered computing system; determining which one or more of the nodes of the clustered computing system should be shut down to regain full connectivity in the clustered computing system based on at least one of reboot status of the nodes and votes associated with the nodes; and shutting down the one or more nodes of the clustered computing system that the determining has determined should be shut down to regain full connectivity in the clustered computing system.

As a clustered computing system, one embodiment of the invention includes a computing cluster having at least three computing nodes, and a connectivity monitoring manager provided within each of the computing nodes. The connectivity monitoring manager operates to detect loss of full connectivity in the clustered computing system. Then, when loss of full connecting has been detected, the connectivity monitoring manager operates to determine which one or more of the nodes of the clustered computing system should be shut down to regain full connectivity in the clustered computing system based on at least one of reboot status of the nodes and votes associated with the nodes.

As a clustered computing system having at least three nodes, the clustered computing system includes: detector configured to detect loss of full connectivity in the clustered computing system; determinator configured to determine, at each of the nodes, which one or more of the nodes of the clustered computing system should be shut down to regain full connectivity in the clustered computing system; and shutdown controller configured to shutting down the one or more nodes of the clustered computing system that the determinator has determined should be shut down to regain full connectivity in the clustered computing system.

As a computer readable medium including computer program code for monitoring full connectivity in a clustered computing system having more than two nodes, the computer readable medium includes: computer program code for detecting loss of full connectivity in the clustered computing system; computer program code for determining, at each of the nodes, which one or more of the nodes of the clustered computing system should be shut down to regain full connectivity in the clustered computing system; and computer program code for shutting down the one or more nodes of the clustered computing system that the computer program code for determining has determined should be shut down to regain full connectivity in the clustered computing system.

The invention has numerous advantages. One advantage of the invention is that it provides a simplified approach to maintaining full connectivity within a clustered computing system. The simplified approach is statistically significantly less likely to have "bugs" (i.e., defects) in the implementing software. Another advantage of the invention is that determination of the particular nodes to shut down can be rapidly performed so as to maintain full connectivity. Still another advantage of the invention is that the processing is locally performed at each of the active nodes.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to techniques for maintaining full connectivity in a clustered computing system. The improved techniques allow for detection of one or more disconnections that cause a loss of full connectivity and then resolution of the disconnections by shutting down one or more appropriate nodes of the clustered computing system to regain full connectivity. As a result, the clustered computing system can effectively maintain a full connectivity condition that is often needed by software running on the nodes of the clustered computing system.

Embodiments of the invention are discussed below with reference to FIGS. 2A–6. However, those skilled in the art will readily appreciate that the detailed description given herein with respect to these figures is for explanatory purposes as the invention extends beyond these limited embodiments.

Figure 2A:
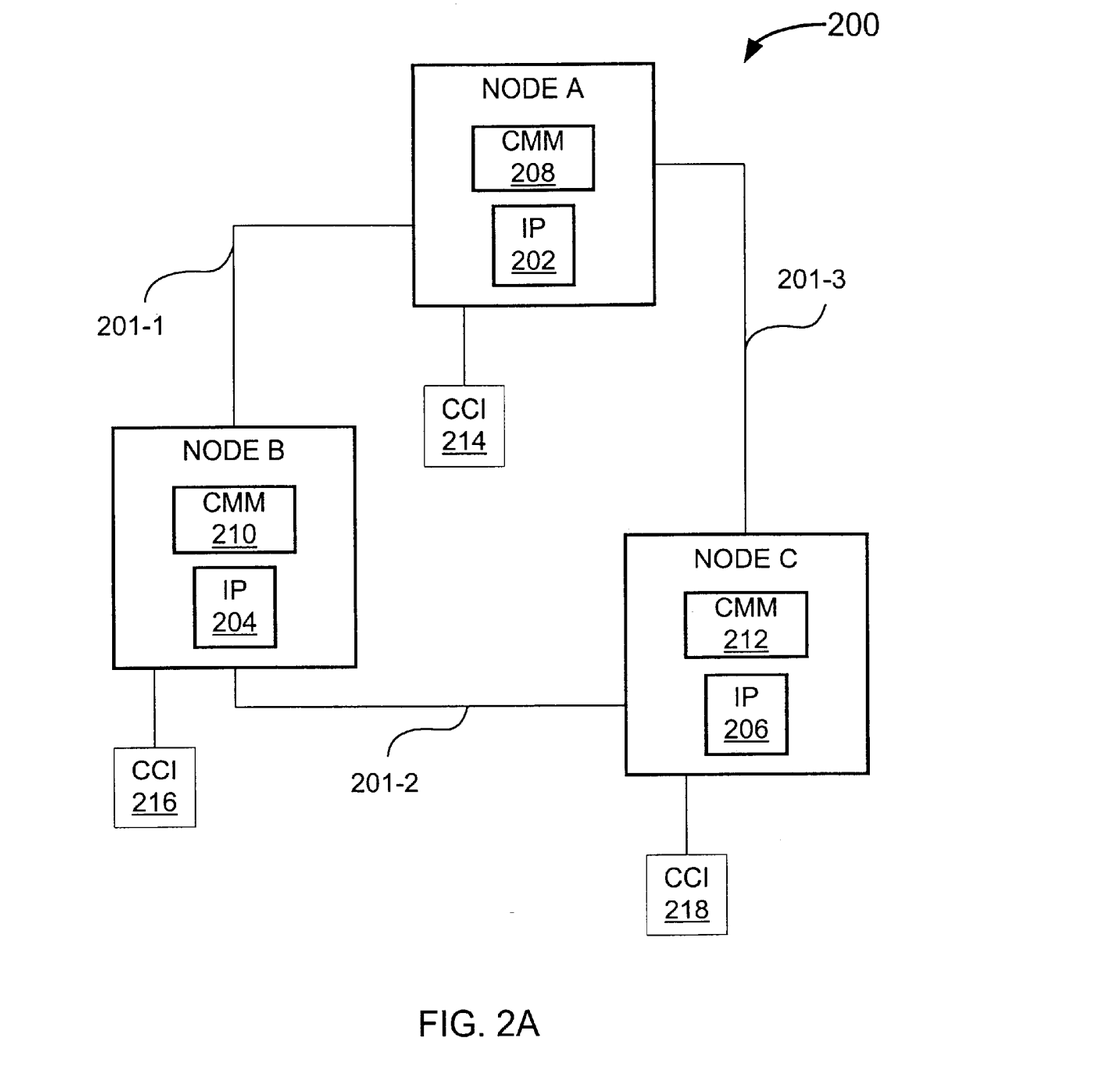
FIG. 2A illustrates an enhance d clustered computing system in accordance with one embodiment of the invention.

FIG. 2A illustrates an enhanced clustered computing system 200 in accordance with one embodiment of the invention. The enhanced clustered computing system 200 includes three computing nodes, node A, node B and node C. The nodes A, B and C are fully interconnected, that is, each node is connected to every other node of the clustered computing system 200.

Each of the nodes A, B and C are typically separate computer systems, such as personal computers or server computers. An interconnect 201 serves to interconnect the nodes with each other. The interconnect 201 includes three segments 201-1, 201-2 and 201-3. The segment 201-1 couples node A and node B. The segment 201-2 couples node B and node C. The segment 201-3 couples node A and node C. In one implementation, the interconnect 201 is provided in a redundant manner with a pair of communication channels provided for each segment. The nodes A, B and C of the clustered computing system 200 are thus coupled together (i.e., interconnected) to form a computing cluster (cluster) and behave as a cohesive logical unit. Accordingly, the enhanced clustered computing system 200 is represented as a single entity to clients (e.g., client 116 of FIG. 1) requesting services from the enhanced clustered computing system 200. It should be recognized that computing clusters are often more complex than three nodes due to the presence of additional components such as one or more additional nodes and/or devices. Examples of devices include storage devices, printers, scanners, cameras, etc.

Each of the nodes A, B and C of the enhanced clustered computing system 200 respectively includes an integrity protector (IP) 202, 204 and 206. Among other things, the integrity protectors 202, 204 and 206 ensure that potential problems, such as partitions in time and partitions in space, do not arise to compromise the integrity of the enhanced clustered computing system 200. A clustered computing system may be undesirably partitioned into two or more sub-clusters that may be formed in time or space. In such situations, the integrity of the clustered computing system may be compromised. In the case of a partition in space, at least two disjointed sub-clusters are formed and the sub-clusters are unable to communicate with each other. With respect to the clustered computing system 200, when two or more disjointed sub-clusters are partitioned in space, the integrity protectors 202, 204 and 206 ensure that integrity of the clustered computing system 200 is preserved. In addition, the integrity protectors 202, 204 and 206 can ensure that a partition in time does not occur when various configurations of the clustered computing system are or have been used at different times. Additional details on the operation of the integrity protectors 202, 204 and 206 are provided in U.S. patent application Ser. No. 09/480,785 (Att.Dkt.No. SUN1 P388/P4541), entitled "METHOD AND APPARATUS FOR MANAGING OPERATIONS OF CLUSTERED COMPUTER SYSTEMS", which has been incorporated by reference above.

Formation of a sub-cluster (including one or more nodes) requires that the sub-cluster be completely partitioned from the remaining cluster. The sub-cluster is then completely disconnected from the nodes of the remaining cluster. On the other hand, although not completely disconnected, nodes of a cluster can be partially connected to other nodes of the cluster. Namely, when there are interconnect failures between nodes such that one or more nodes are unable to directly communicate with some of the other nodes, the clustered computing system has incomplete (or partial) connectivity. The loss of full connectivity is referred to herein as incomplete (or partial) connectivity.

The nodes A, B and C of the enhanced clustered computing system 200 also respectively include connectivity monitoring managers (CMM) 208, 210 and 212. The connectivity monitoring managers 208, 210 and 212 monitor their respective nodes for loss of full connectivity due to one or more disconnects. A disconnect occurs when a node of a clustered computing system cannot directly communicate to another node. When one or more disconnects are present between nodes of the clustered computing system 200, full connectivity is lost and partially connectivity results (assuming some connections remain).

In one embodiment, each node of the clustered computing system 200 can monitor connectivity with other nodes through the use of periodic messages that are interchanged between the nodes. When a node does not receive such a responsive message from another node, the node can conclude that there is a disconnect present which causes a loss of full connectivity. When the node notices a disconnect, the node is also informed from other nodes that the disconnected node remains connected to one or more other nodes of the clustered computing system.

Figure 2B:
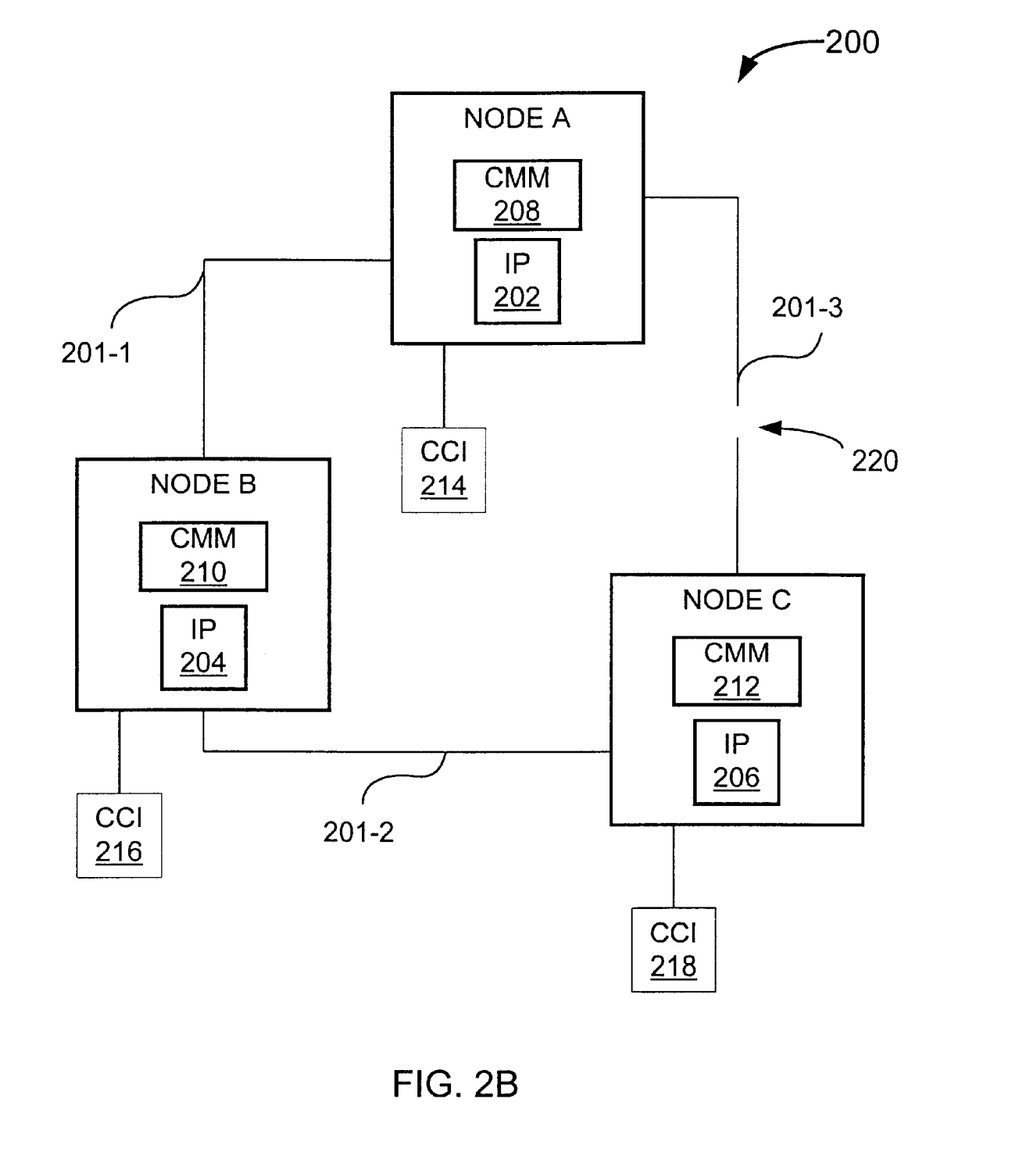
FIG. 2B is a diagram illustrating the clustered computing system of FIG. 2A in which a disconnect has occurred between nodes A and C.

FIG. 2B is a diagram illustrating the clustered computing system 200 of FIG. 2A in which a disconnect 220 has occurred between nodes A and C. The disconnect 220 causes the clustered computing system 200 to have only partial connectivity. The disconnect 220 results because the segment 201-3 has failed. In the case where the segment 201-3 is a redundant interconnection, both the primary and backup interconnects have failed.

When the connectivity monitoring managers 208, 210 and 212 determine that full connectivity has been lost, the connectivity monitoring managers 208, 210 and 212 operate to determine which of the nodes A, B or C should be shut down to regain full connectivity. In this regard, the connectivity monitoring managers 208, 210 and 212 provided on each of the nodes A, B and C are able to locally determine which of the nodes should be shut down to regain full connectivity. With respect to the clustered computing system 200 shown in FIG. 2B, the connectivity monitoring managers 208, 210 and 212 will determine which of nodes A or C should be shut down to resolve the disconnect 220 and regain full connectivity.

In one embodiment, the connectivity monitoring managers 208, 210 and 212 apply a set of rules at each of the nodes A, B and C. The set of rules are used to determine which of the nodes should be shut down. With respect to the disconnect 220 existing between nodes A and C, one of the nodes A or C is selected for shutdown. According to one implementation, the set of rules is as follows. The first rule is that if one node is rebooting and the other node is already part of the active computing cluster, then the rebooting node is selected for shutdown. Typically, a rebooting node will signal other nodes with status messages that indicate rebooting status (e.g., a rebooting status flag). The second rule is that if one node controls less votes than the other node, then the node that controls the least votes is selected for shutdown. For efficiency, the determining of the votes a node can control is based on static configuration information for the computing cluster (such as provided in the CCIs 214, 216 and 218 discussed below) so that processing to determine actual votes for the nodes is not needed. The third and final rule is that the node with the highest node number is selected for shutdown. Each of the nodes of the computing cluster is provided with a unique node number. Typically, the node number is an integer and increments with each node added to the computing cluster. It is important to note that the invention is not limited to the use of these three rules and thus various other easily applied rules can be use in various combinations.

Each node A, B and C also stores Cluster Configuration Information (CCI) for the enhanced clustered computing system 200. Each node stores its own version of the CCI which should in general be identical. Namely, node A stores CCI 214, node B stores CCI 216, and node C stores CCI 218 in memory storage available to the nodes (namely, persistent storage such as disk storage). The CCI 214, 216 and 218 are typically stored in local storage devices for each node, such storage devices are also referred to as cluster configuration registries (or repositories). The CCI is information that represents the configuration of the enhanced clustered computing system 200. For example, the CCI can describe nodes, devices and interconnections of the enhanced clustered computing system 200. In addition, the CCI can also include component vote information that details information such as a list of nodes, votes for the nodes, proxy devices, votes for the proxy devices, and connections for the proxy devices.

For example, in the case where the disconnect 220 results in the segment 201-3 of the enhanced clustered computing system 200 as shown in FIG. 2B, the connectivity monitoring managers 208, 210 and 212 provided on each of the nodes A, B and C is able to locally determine which of the nodes A or C should be shut down to regain full connectivity. Given that the disconnect 220 is between node A and C, one of nodes A and C will be chosen to be shut down. Here, assume that each node controls only a single vote. Each node can determine the vote for the various nodes of the enhanced clustered computing system 200 using the CCI that is locally available. Also assume that none of the nodes A, B or C has recently been rebooted. In such a case, the first and second rules are not determinative of the node to be shut down. The determination is made by the third rule. Further, assume that node A has node number 1, node B has node number 2, and node C has node number 3. Hence, the third rule will select node C to be shut down because it has the higher node number.

As noted earlier, in addition to nodes, clustered computing systems may also include devices such as storage devices (e.g., storage disks), printers, scanners, cameras, etc. In one embodiment, one or more devices are assigned "proxy" votes that can be controlled by at least one of the nodes of the clustered computing system. The devices that can be assigned proxy votes are also referred to herein as "proxy devices".

Figure 2C:
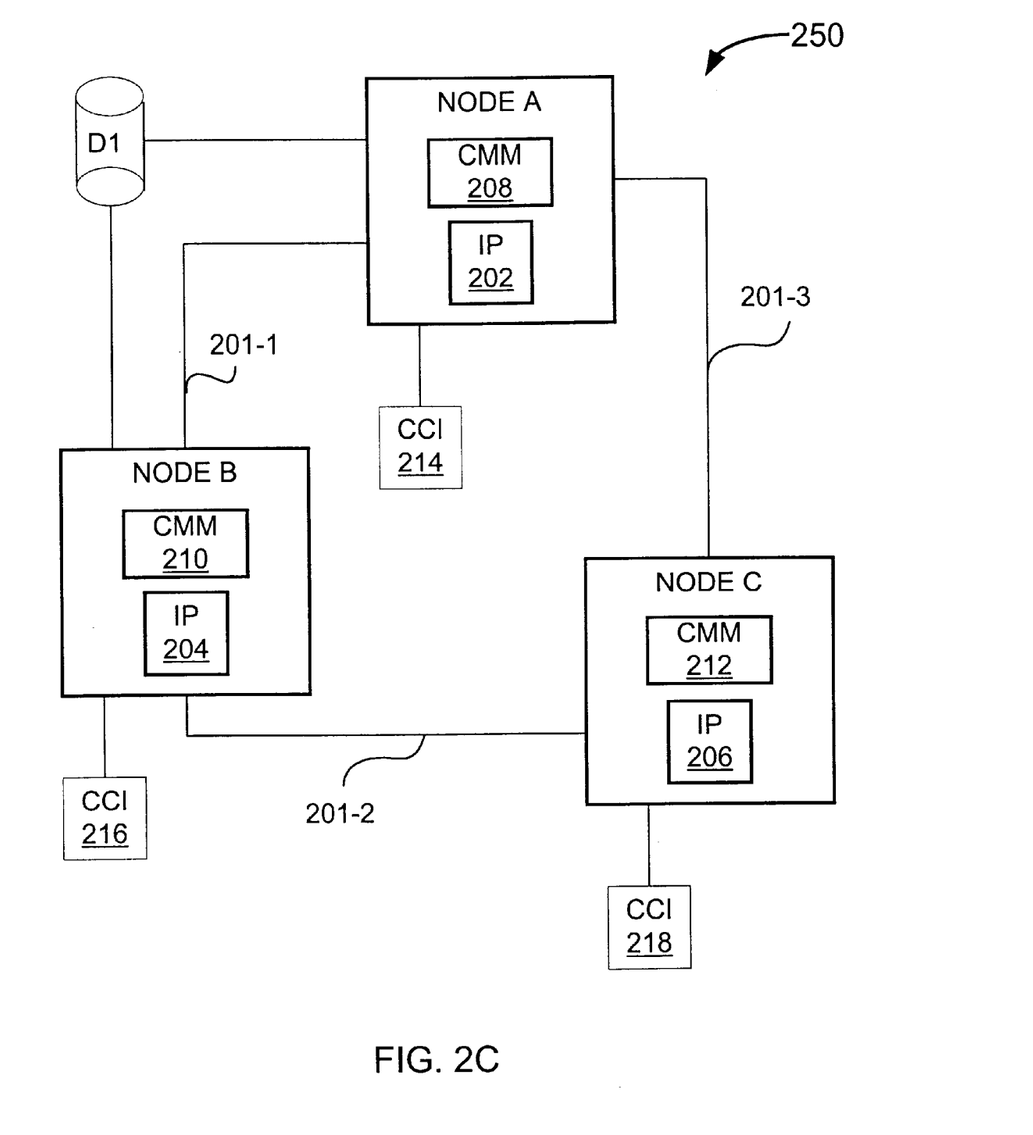
FIG. 2C illustrates an exemplary enhanced clustered computing system in accordance with another embodiment of the invention.

FIG. 2C illustrates an exemplary enhanced clustered computing system 250 in accordance with another embodiment of the invention. The enhanced cluster computing system 250 is generally the same as the enhanced clustered computing system 200 of FIG. 2A but further includes one or more other devices such as a storage device D1. The storage device D1 can be shared by nodes A and B such that it can be accessed by both nodes A and B. The storage device D1 is a proxy device. In one embodiment, the storage device D1 can be assigned (N−1) proxy votes, wherein N is the number of nodes configured to access the storage device D1. For example, in the case of the enhanced clustered computing system 250 of FIG. 2C, the storage device D1 would be assigned one (1) proxy vote, since two nodes (A and B) are configured to access the storage device D1. However, more generally, a proxy device can be assigned votes in various other ways. Accordingly, in applying the second rule noted above, the connectivity monitoring managers 208, 210 and 212 will consider nodes A and B to control two (2) votes, one vote for the node itself and one vote for the storage device D1, and will consider node C to control only one vote for the node itself. Although often only one of the nodes can obtain the proxy vote, in one embodiment, potential votes can be used to simplify processing. The potential votes correspond to a voting scheme in which each of the nodes with access to the proxy device can be deemed entitled to control its proxy vote.

If the above example of determining which of the nodes to shut down is reconsidered for the enhanced clustered computing system 250 of FIG. 2C which includes the storage device D1 as a proxy device, the second rule is used. In this case, the votes for the nodes are different. Namely, node A controls two votes (one for the node and one for the storage device D1), node B controls two votes (one for the node and one for the storage device D1), and node C controls one vote. In this case, the second rule is determinative because the vote for node A is greater than the vote for node C. Accordingly, the second rule will select node C to be shut down because it has less votes. The third rule is then not utilized.

Figure 3:
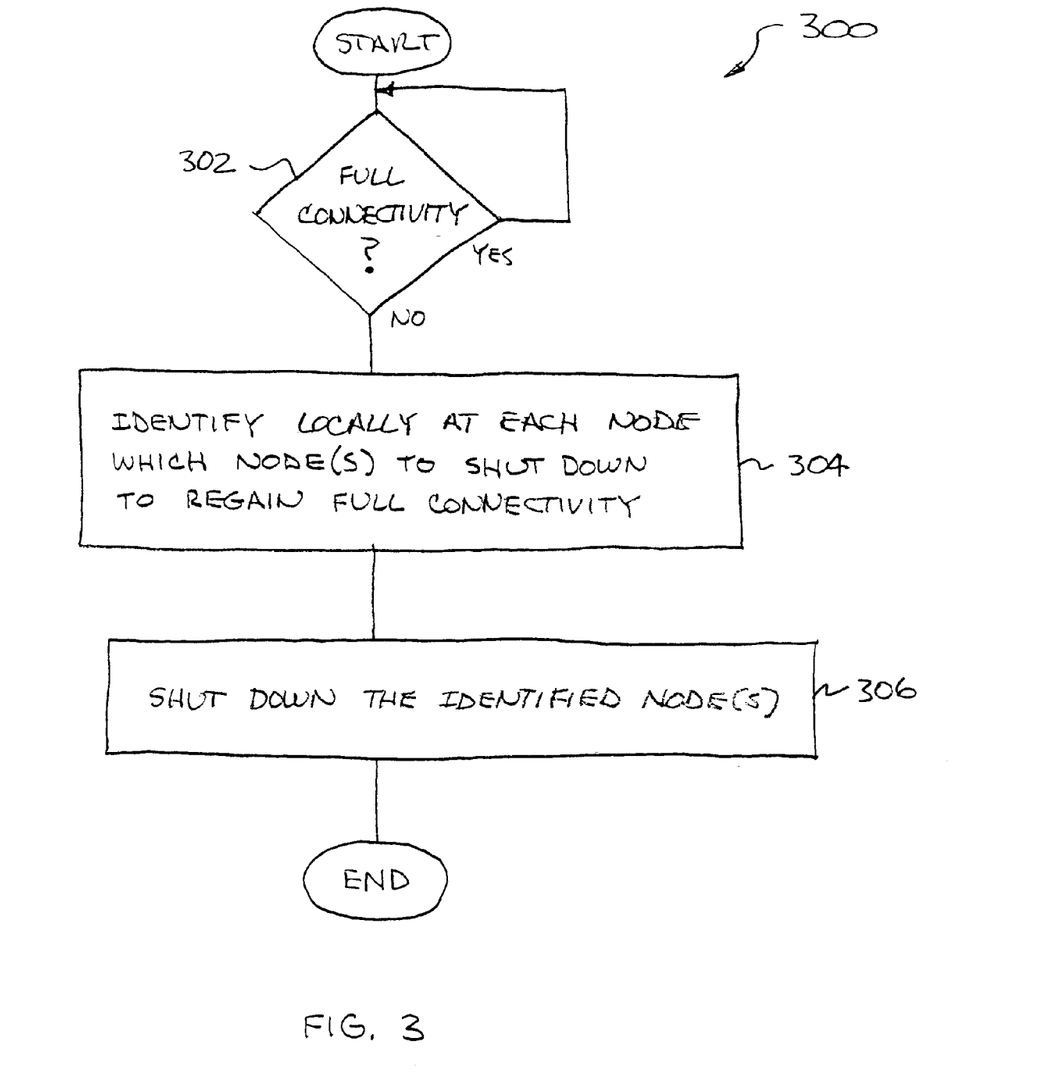
FIG. 3 is a flow diagram of connectivity maintenance processing according to one embodiment of the invention.

FIG. 3 is a flow diagram of connectivity maintenance processing 300 according to one embodiment of the invention. The connectivity maintenance processing 300 is, for example, performed by a clustered computing system. More particularly, the connectivity maintenance processing 300 can be performed by the connectivity monitoring managers (CMMs) 208, 210 and 212 of the enhanced clustered computing systems 200 and 250 as shown in FIGS. 2A and 2C.

The connectivity maintenance processing 300 begins with a decision 302 that determines whether full connectivity is present in the clustered computing system. When the decision 302 determines that full connectivity is present, the connectivity maintenance processing 300 is not pursued. On the other hand, when the decision 302 determines that full connectivity is not present, then the connectivity maintenance processing 300 is utilized to return the clustered computing system to a full connectivity state. When full connectivity has been lost, the clustered computing system is referred to as having partial connectivity. In other words, the connectivity maintenance processing 300 can also be considered to be invoked once full connectivity has been lost and partial connectivity is present.

In any event, once the decision 302 determines that full connectivity has been lost (i.e., a partial connectivity state exists), each node can locally identify 304 those one or more nodes of the clustered computing system to be shut down to regain full connectivity. In other words, by evaluating where the disconnects occur within the clustered computing system, each node is able to locally identify those one or more nodes that should be shut down so as to regain full connectivity. Hence, each node identifies the same one or more nodes to be shut down. Once the nodes to be shut down have been identified 304, the identified one or more nodes are shut down 306. After the identified nodes have been shut down, the connectivity maintenance processing 300 is complete and ends as the clustered computing system has returned to a full connectivity state.

Figure 4A:
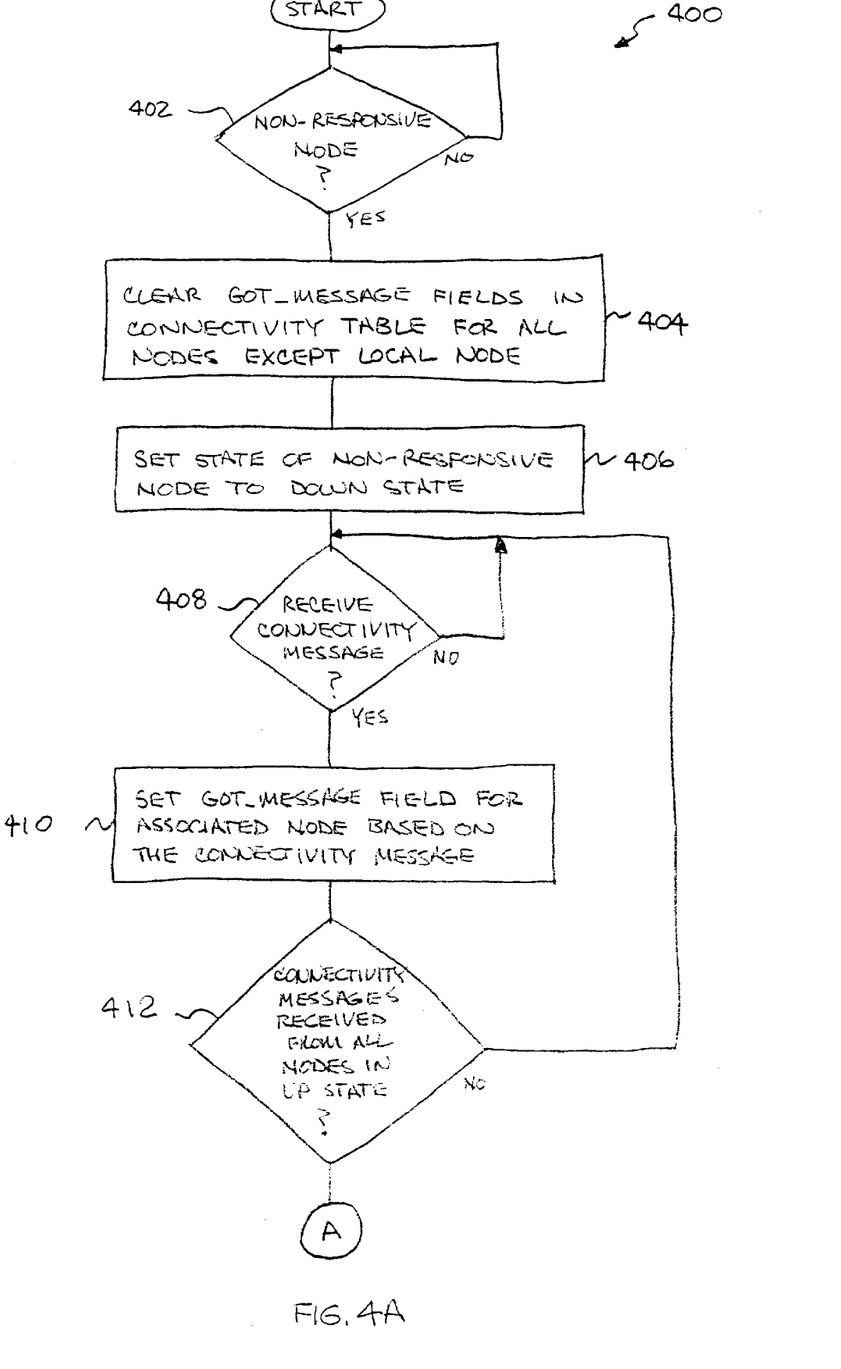
FIGS. 4A and 4B are flow diagrams of connectivity maintenance processing according to another embodiment of the invention.
Figure 4B:
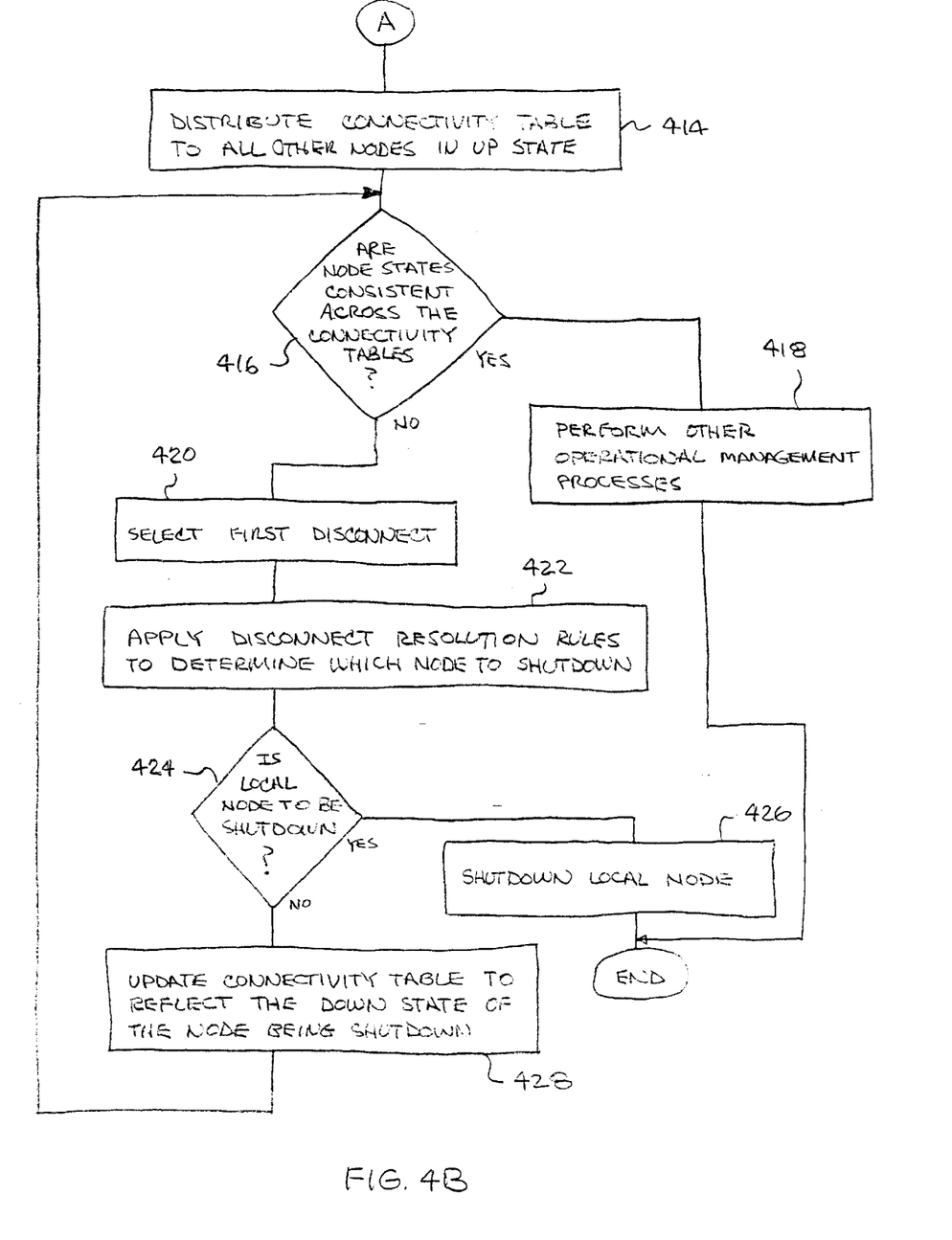

FIGS. 4A and 4B are flow diagrams of connectivity maintenance processing 400 according to another embodiment of the invention. The connectivity maintenance processing 400 is, for example, performed by the connectivity monitoring managers 208, 210 and 212 illustrated in FIGS. 2A–2C. The connectivity maintenance processing 400 is described below as being performed on a local node.

The connectivity maintenance processing 400 begins with a decision 402 that determines whether a non-responsive node has been detected. When the decision 402 determines that a non-responsive node has not been detected, the decision 402 causes the connectivity maintenance processing 400 to await the detection of a non-responsive node. In other words, the connectivity maintenance processing 400 can be considered to be invoked once a non-responsive node has been detected. The non-responsive node is another node within the computing cluster (or sub-cluster if a sub-cluster has also formed) along with the local node.

In any case, once the decision 402 determines that a non-responsive node has been detected, got_message fields in a connectivity table are cleared 404 for all nodes except the local node. The connectivity table is stored on the local node for the purpose of detecting connectivity conditions of the clustered computing system. Next, the state of the non-responsive node is set 406 to a down state. In one implementation, the connectivity table can include not only the got_message fields but also the states of each of the nodes of the clustered computing system.

Next, a decision 408 determines whether a connectivity message has been received from another node. When the decision 408 determines that a connectivity message from another node has not been received, the decision 408 causes the connectivity maintenance processing 400 to await the receipt of a connectivity message. Once the decision 408 determines that a connectivity message has been received, the got_message field for the associated node is set 410 based on the connectivity message received. Here, for example, the connectivity messages can indicate what other nodes believe their status to be. Also, it should be noted that the connectivity messages will be received only from those of the other nodes that remain connected to the local node. That is, if a node is disconnected (i.e., non-responsive node) from the local node, the connectivity message will not arrive at the local node. A time-out provision can be used to limit the wait time to receive the connectivity messages.

A decision 412 then determines whether connectivity messages have been received from all of the nodes in an up state (also referred to as responsive nodes). Here, the decision 412 is determining whether all the connectivity messages expected have been received. When the decision 412 determines that connectivity messages have not been received from all of the nodes in the up state, the connectivity maintenance processing 400 returns to repeat the decision 408 and subsequent blocks. Once the decision 412 determines that connectivity messages have been received from all of the nodes in the up state, the connectivity table is distributed 414 to all other nodes in the up state. Since the other nodes are also performing the same processing, the local node is receiving connectivity tables from the other nodes that are in the up state from the local node's perspective. Each of the connectivity tables represents what the particular node believes the connectivity of the nodes to be with respect to that particular node.

Next, a decision 416 determines whether the node states are consistent across the connectivity tables. Here, each node has received connectivity tables from other nodes and also has its own connectivity table. The decision 416 compares the various connectivity tables to determine whether the node states are consistent. When the node states are not consistent, then one or more disconnects are present within the clustered computing system. However, when the node states are consistent, the clustered computing system has full connectivity.

Hence, when the decision 416 determines that the node states are consistent across the connectivity tables, full connectivity is present and, therefore, no additional processing is necessary to regain full connectivity. However, other operational management processes may typically performed 418. As an example, the other operational processes can operate to examine the clustered computing system for prevention of partitions in space or time. Additional details on such operational management processes can be found in FIG. 6 below and in U.S. patent application Ser. No. 09/480,785 (Att.Dkt.No.: SUN1 P388/P4541), entitled "METHOD AND APPARATUS FOR MANAGING OPERATIONS OF CLUSTERED COMPUTER SYSTEMS" which has been incorporated by reference above. Thereafter, the connectivity maintenance processing 400 is complete and ends.

On the other hand, when the decision 416 determines that the node states are not consistent across the connectivity tables, then a partial connectivity state exists due to the presence of one or more disconnects and additional processing is performed to return the clustered computing system to a full connectivity state. Here, the decision 416 serves to identify one or more disconnects, each of which is associated with a pair of nodes. A first disconnect of the one or more disconnects is then selected 420.

Next, disconnect resolution rules are applied 422 to determine which node is to be shut down. The disconnect resolution rules are a series of easily resolved and locally applied rules that allow for a simple determination of the appropriate node to shut down. The application of the disconnect resolution rules is further described below with respect to FIG. 5. After the disconnect resolution rules have been applied 422, a decision 424 determines whether the local node is to be shut down. Here, the node performing the connectivity maintenance processing 400, the local node, determines 424 whether it is to be shut down. When the decision 424 determines that the local node is to be shut down, the local node is shut down 426. Following block 426, the connectivity maintenance processing 400 is complete and ends, as the local node performing the connectivity maintenance processing 400 has been shutdown.

Alternatively, when the decision 424 determines that the local node is not to be shut down, the connectivity table for the local node is updated 428 to reflect the down state of the node being shut down. After the update 428 to the connectivity table, the connectivity maintenance processing 400 returns to repeat the decision 416 and subsequent blocks so that the connectivity maintenance processing 400 is able to process other disconnects. Here, each disconnect is selected 420 and then processed to remove that disconnect by shutting down one of the nodes of the clustered computing system that are associated with the disconnect. Hence, when the connectivity maintenance processing 400 returns to repeat the decision 416, if another disconnect exists causing partial connectivity, blocks 420–428 are repeated. Once the decision 416 determines that all of the disconnects have been resolved and full connectivity exists, the other operational management processes can be performed 418 as noted above and the connectivity maintenance processing 400 ends.

Figure 5:
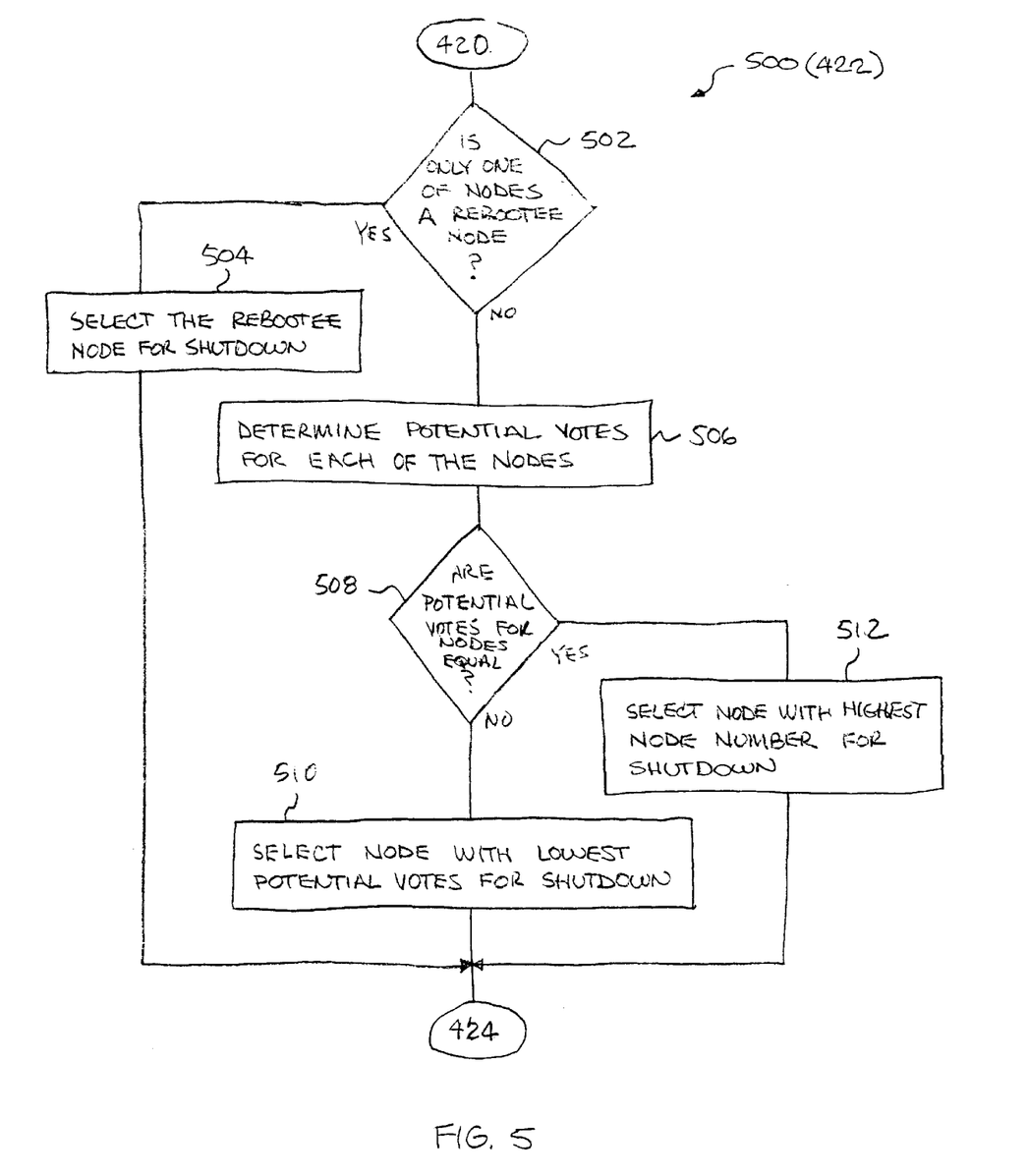
FIG. 5 is a flow diagram of disconnect resolution processing according to one embodiment of the invention.

FIG. 5 is a flow diagram of disconnect resolution processing 500 according to one embodiment of the invention. The disconnect resolution processing 500 is, for example, performed by the block 422 illustrated in FIG. 4B. In other words, the disconnect resolution processing 500 operates to identify or select a particular node within the clustered computing system that is to be shut down so as to resolve (or eliminate) a disconnect within the clustered computing system.

The disconnect resolution processing 500 begins with a decision 502. The decision 502 examines information on the nodes of the clustered computing system to determine whether at most one of the nodes is a rebootee node. A rebootee node refers to a node that has been recently rebooted. When the decision 502 determines that one of the nodes associated with the disconnect is a rebootee node, then the rebootee node is selected 504 for shut down. Here, the disconnect resolution processing 500 operates to select the rebootee node for shut down when one of the nodes is a rebootee node. The rebootee node is selected because it likely does not yet have services (e.g., applications) operating thereon which would be disturbed if shut down. Alternatively, when the decision 502 determines that there are no rebootee nodes or both nodes are rebootee nodes, then potential votes for each of the nodes are determined 506. The potential votes correspond to a voting scheme in which the nodes associated with the disconnect are assigned votes and can also own proxy votes associated with devices that the nodes are able to access (e.g., storage devices). For example, if a node has a node vote of one (1) and can access a device having two (2) proxy votes, the potential vote for the node would be three (3) votes. The potential votes for the nodes can be determined using the Cluster Configuration Information (CCI). Additional details on votes can be found in the related cases noted above.

Next, a decision 508 determines whether the potential votes for the nodes associated with the disconnect are equal. Here, the decision 508 is determining whether one of the nodes has a greater potential votes than the other node. In this embodiment, it is assumed that the decision 508 is determining whether the nodes both have the same potential votes. When the decision 508 determines that the potential votes of both the nodes are not equal, the node with the lowest potential votes is selected for shut down. Here, the disconnect resolution processing 500 operates to select the node with the lowest potential vote for shut down as the lower vote often signifies less importance in the clustered computing system. On the other hand, when the decision 508 determines that the potential votes for both the nodes are equal, the node with the highest node number is selected 512 for shut down. In this case, since the potential votes are all equal, the votes are not useful for selecting the particular node to be shut down. Hence, in this case, the node to be shut down is selected based on the node number. Here, the node with the highest node number is selected 512 for shut down. The highest node number is, in this example, the most recently added node. Hence, although the disconnect resolution processing 500 prefers to select the node for shut down from the rebootee and, if not by rebootee, then by potential votes and, lastly, if not by potential votes, by node number. Following blocks 504, 510 and 512, the disconnect resolution processing 500 is complete and ends.

Figure 6:
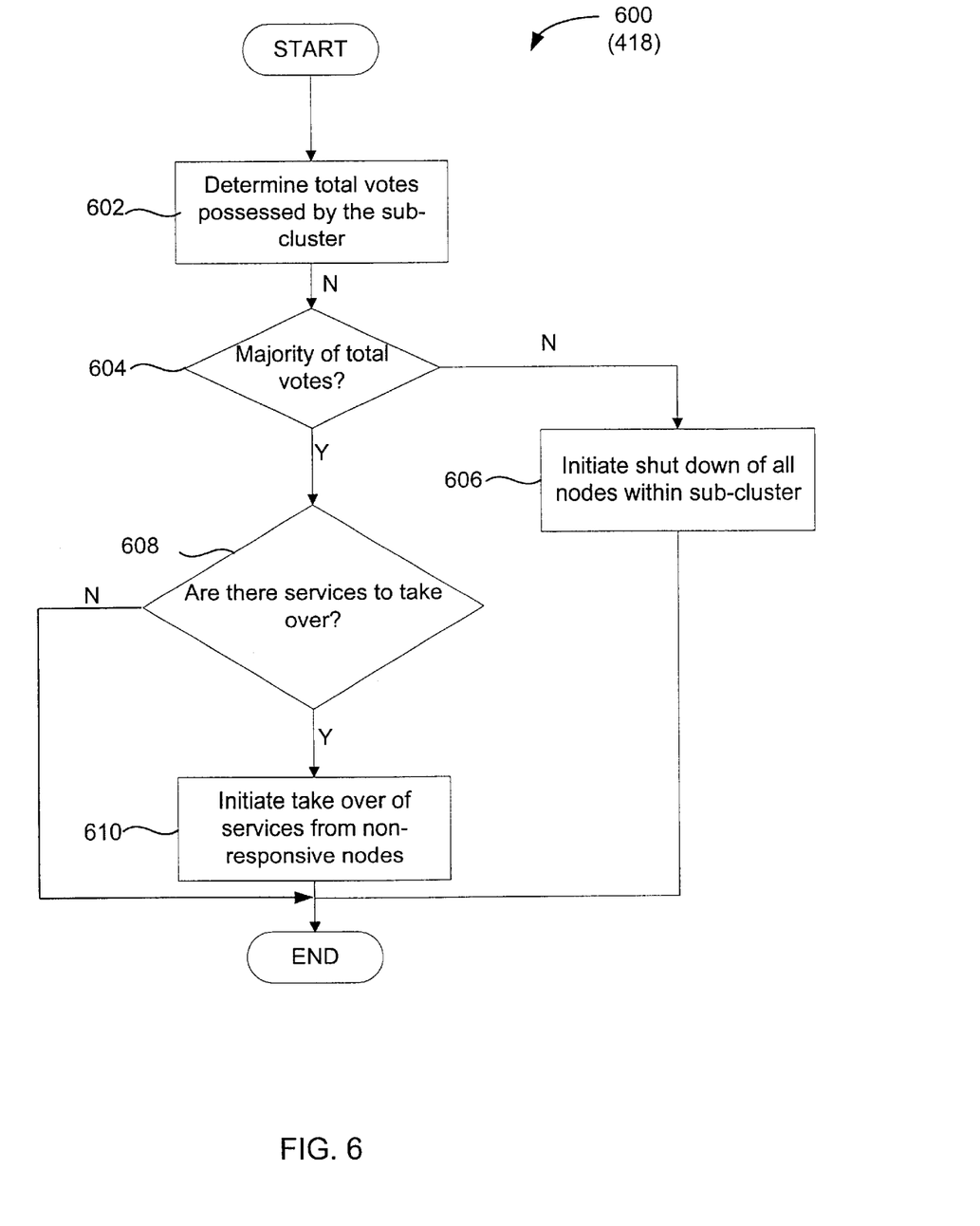
FIG. 6 illustrates an operational management method for managing operations of a clustered computing system according to one embodiment.

FIG. 6 illustrates an operational management method 600 for managing operations of a clustered computing system according to one embodiment. Namely, the operational management method 600 guards against undesired partitions in space that can occur when the cluster of the clustered computing system fragments into sub-clusters. In particular, the operational management method 600 represents processing performed during the operation 418 of FIG. 4B. For example, the operational management method 600 can be implemented as a series of operations that are performed by the enhanced clustered computing systems 200 and 250 discussed above with respect to FIGS. 2A and 2C. In one implementation, the operational management method 600 is performed by the integrity protectors (IP) 202, 204 and 206 of the enhanced clustered computing systems 200 and 250. The operational management method 600 can be performed on each of the active nodes of the clustered computing system.

Initially, at an operation 602, the total number of votes possessed by a sub-cluster (sub-cluster votes) is determined. The sub-cluster includes one or more computing nodes that are responsive to each other. The sub-cluster can result after one or more nodes of the computing cluster are shut down to regain full connectivity. Next, in an operation 604 a determination is made as to whether the total votes possessed by the sub-cluster is a majority of total number votes available in the clustered computing system. The total number of votes available can be a number that is determined based on the computing nodes and/or devices that are configured in the clustered computing system. For example, the total number of votes can be determined by each node based on the CCI is available at each node. If the number of votes possessed by the sub-cluster does not constitute a majority, shutdown of all nodes within the sub-cluster is initiated as noted in operation 606. On the other hand, if the number of votes possessed by the sub-cluster represents a majority of the total number of votes available, the operational management method 600 proceeds to operation 608 where a decision is made to determine whether any of the services need to be taken over from the non-responsive nodes.

According to the operational management method 600, at most one sub-cluster can possess a majority of total votes in the clustered computing system even if one component is in the process of being added or removed. If any of the services provided by non-responsive nodes need to be taken over (as determined by operation 608), take over of services from the non-responsive nodes can be initiated by the sub-cluster having the majority of total votes in the clustered computing system at operation 610. Otherwise, if there are no services to be taken over, the operational management method 600 bypasses operation 610. Following operations 606 and 610, as well as operation 608 when no services are to be taken over, the operational management method 600 ends.

The invention can use a combination of hardware and software components. The software can be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. Different embodiments or implementations may have one or more of the following advantages. One advantage of the invention is that it provides a simplified approach to maintaining full connectivity within a clustered computing system. The simplified approach is statistically significantly less likely to have "bugs" (i.e., defects) in the implementing software. Another advantage of the invention is that determination of nodes to shut down so as to maintain full connectivity can be rapidly determined. Still another advantage of the invention is that the processing is locally performed at each of the active nodes.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for monitoring full connectivity in a clustered computing system having more than two nodes, said method comprising:
   (a) detecting loss of full connectivity in the clustered computing system, wherein each of the nodes of the clustered computing system is directly connected via at least one communication link to every other node in the clustered computing system when the clustered computing system is fully connected;
   (b) determining, at each of the nodes, which one or more of the nodes of the clustered computing system should be shut down to regain full connectivity in the clustered computing system; and
   (c) shutting down the one or more nodes of the clustered computing system that said determining (b) has determined should be shut down to regain full connectivity in the clustered computing system, wherein each of the nodes has a unique node number, and
   wherein said determining (b) comprises:
      (b1) determining whether one of the nodes has recently been rebooted;
      (b2) selecting the one of the nodes that has recently been rebooted to be shut down when said determining (b1) determines that one of the nodes has recently been rebooted;
      (b3) determining a potential vote for each of the nodes;
      (b4) determining whether one of the nodes has a lower potential vote than other of the nodes;
      (b5) selecting the one of the nodes having the lowest potential vote to be shut down when said determining (b1) determines that one of the nodes has not recently been rebooted and said determining (b4) determines that one of the nodes has a lower potential vote than other of the nodes; and
      (b6) selecting the one of the nodes based on the node number to be shut down when said determining (b1) determines that one of the nodes has not recently been rebooted and said determining (b4) determines that none of the nodes has a lower potential vote than other of the nodes.

2. A method for maintaining full connectivity in a clustered computing system having more than two nodes, said method comprising:
   (a) detecting loss of full connectivity in the clustered computing system, wherein each of the nodes of the clustered computing system is directly connected via at least one communication link to every other node in the clustered computing system when the clustered computing system is in a state of full connectivity;
   (b) determining which one or more of the nodes of the clustered computing system should be shut down to regain full connectivity in the clustered computing system based on at least one of reboot status of the nodes and votes associated with the nodes; and
   (c) shutting down the one or more nodes of the clustered computing system that said determining (b) has determined should be shut down to regain full connectivity in the clustered computing system,
   wherein said detecting (a) operates to identify one or more disconnections, wherein said determining (b) and said shutting down (c) operate to process each disconnection, disconnection-by-disconnection, until full connectivity is regained, wherein each of the nodes has a unique node number, and wherein said determining (b) comprises:
      (b1) determining whether one of the nodes has recently been rebooted;
      (b2) selecting the one of the nodes that has recently been rebooted to be shut down when said determining (b1) determines that one of the nodes has recently been rebooted;
      (b3) determining a potential vote for each of the nodes;
      (b4) determining whether one of the nodes has a lower potential vote than other of the nodes;
      (b5) selecting the one of the nodes having the lowest potential vote to be shut down when said determining (b1) determines that one of the nodes has not recently been rebooted and said determining (b4) determines that one of the nodes has a lower potential vote than other of the nodes; and
      (b6) selecting the one of the nodes based on the node number to be shut down when said determining (b1) determines that one of the nodes has not recently been rebooted and said determining (b4) determines that none of the nodes has a lower potential vote than other of the nodes.

3. A method for maintaining full connectivity in a clustered computing system having more than two nodes, said method comprising:
   (a) detecting loss of full connectivity in the clustered computing system, wherein each of the nodes of the clustered computing system is directly connected via at least one communication link to every other node in the clustered computing system when the clustered computing system is in a state of full connectivity;
   (b) determining which one or more of the nodes of the clustered computing system should be shut down to regain full connectivity in the clustered computing system based on at least one of reboot status of the nodes and votes associated with the nodes; and
   (c) shutting down the one or more nodes of the clustered computing system that said determining (b) has determined should be shut down to regain full connectivity in the clustered computing system,
   wherein said detecting (a) operates to identify one or more disconnections, wherein said determining (b) and said shutting down (c) operate to process each disconnection, disconnection-by-disconnection, until full connectivity is regained, wherein each of the nodes has a unique node number, wherein said determining (b) comprises:
(b1) determining whether one of the nodes has recently been rebooted;
(b2) selecting the one of the nodes that has recently been rebooted to be shut down when said determining (b1) determines that one of the nodes has recently been rebooted;
(b3) determining a potential vote for each of the nodes;
(b4) determining whether one of the nodes has a lower potential vote than other of the nodes;
(b5) selecting the one of the nodes having the lowest potential vote to be shut down when said determining (b1) determines that one of the nodes has not recently been rebooted and said determining (b4) determines that one of the nodes has a lower potential vote than other of the nodes; and
(b6) selecting the one of the nodes based on the node number to be shut down when said determining (b1) determines that one of the nodes has not recently been rebooted and said determining (b4) determines that none of the nodes has a lower potential vote than other of the nodes;

wherein said detecting (a) operates to identify one or more disconnections, and wherein said determining (b) and said shutting down (c) operate to process each disconnection, disconnection-by-disconnection, until full connectivity is regained.

* * * * *